United States Patent
Basso et al.

(10) Patent No.: US 7,406,080 B2
(45) Date of Patent: Jul. 29, 2008

(54) METHOD AND STRUCTURE FOR ENQUEUING DATA PACKETS FOR PROCESSING

(75) Inventors: Claude Basso, Raleigh, NC (US); Jean L. Calvignac, Raleigh, NC (US); Chih-jen Chang, Apex, NC (US); Gordon T. Davis, Chapel Hill, NC (US); Fabrice J. Verplanken, La Gaude (FR)

(73) Assignee: International Business Machines Corporation, Armonk, NY (US)

( * ) Notice: Subject to any disclaimer, the term of this patent is extended or adjusted under 35 U.S.C. 154(b) by 766 days.

(21) Appl. No.: 10/868,725

(22) Filed: Jun. 15, 2004

(65) Prior Publication Data

US 2006/0039376 A1 Feb. 23, 2006

(51) Int. Cl.
*H04L 12/56* (2006.01)
(52) U.S. Cl. ............... 370/392; 370/412; 370/429; 711/119
(58) Field of Classification Search ............... None
See application file for complete search history.

(56) References Cited

U.S. PATENT DOCUMENTS

| | | | | |
|---|---|---|---|---|
| 6,032,190 | A * | 2/2000 | Bremer et al. | 709/238 |
| 6,343,072 | B1 * | 1/2002 | Bechtolsheim et al. | 370/351 |
| 6,401,147 | B1 | 6/2002 | Sang et al. | 710/56 |
| 2003/0210684 | A1 * | 11/2003 | Lai et al. | 370/381 |
| 2003/0223366 | A1 | 12/2003 | Jeffries et al. | 370/231 |
| 2003/0223368 | A1 | 12/2003 | Allen, Jr. et al. | 370/235 |
| 2005/0018609 | A1 * | 1/2005 | Dally et al. | 370/235 |
| 2005/0129020 | A1 * | 6/2005 | Doyle et al. | 370/392 |
| 2005/0144510 | A1 * | 6/2005 | Zayas | 714/5 |

FOREIGN PATENT DOCUMENTS

JP 2000115224 A 4/2000

OTHER PUBLICATIONS

IBM Technical Disclosure Bulletin entitled "Overflow/Fault Recovery Using Automatic Network Routing", Sep. 1990, pp. 1-6.

* cited by examiner

*Primary Examiner*—Wing F. Chan
*Assistant Examiner*—Brian Roberts
(74) *Attorney, Agent, or Firm*—Joscelyn G. Cockburn; Anthony M. Del Zoppo, III; Driggs, Hogg, Daugherty & Del Zoppo Co., LPA

(57) ABSTRACT

A method and structure is provided for buffering data packets having a header and a remainder in a network processor system. The network processor system has a processor on a chip and at least one buffer on the chip. Each buffer on the chip is configured to buffer the header of the packets in a preselected order before execution in the processor, and the remainder of the packet is stored in an external buffer apart from the chip. The method comprises utilizing the header information to identify the location and extent of the remainder of the packet. The entire selected packet is stored in the external buffer when the buffer of the stored header of the given packet is full, and moving only the header of a selected packet stored in the external buffer to the buffer on the chip when the buffer on the chip has space therefor.

8 Claims, 3 Drawing Sheets

METHOD AND STRUCTURE FOR ENQUEUING DATA PACKETS FOR PROCESSING

FIELD OF THE INVENTION

This invention relates generally to an improved structure and method for enqueuing data packets of information for processing prior to being transmitted and, more particularly, to a method and structure for providing separate queues for storing certain information regarding different packets of information to increase the speed of response for dequeuing enqueued packets of information.

BACKGROUND OF THE INVENTION

According to conventional prior art methods and structures when data packets are to be processed for transmission, if there is encountered a flow of data packets which is greater than the processor can handle, these data packets have been stored off the chip in DRAM memory devices in one or more queues. The DRAM storage devices techniques, while providing good storage space, nevertheless are rather slow, thus increasing latency, and during peak periods may not work effectively. Therefore, a more rapid access to enqueued data packets is desired to decrease latency and increase processing capabilities.

SUMMARY OF THE INVENTION

A method and structure for buffering data packets is provided, each having a header portion and a remainder portion in a network processor system. The network processor system has a processor on a chip and at least one buffer on said chip. Each buffer on the chip is configured to buffer the header portion of the data packets in a preselected order prior to execution in the processor, and the remainder portion of the data packet is stored in an external buffer apart from the chip. The method comprises utilizing the information in the header portion to identify at least the location and extent of the remainder portion of the data packet. The entire data packet of a selected data packet is stored in the external buffer when the buffer on the stored header of the given data packet is full, and moving only the header of a selected entire data packet stored in the external buffer to the buffer on the chip when the buffer on the chip has space therefor.

A computer program contained on media for buffering data packets is provided. Each data packet has a header portion and a remainder portion in a network processor system. The network processor system has a processor on a chip and at least one buffer on the chip. Each buffer on the chip is configured to buffer the header portion of the data packets in a preselected order prior to execution in the processor. The remainder portion of the data packet is stored in an external buffer apart from the chip. The program comprises the steps of: utilizing the information in the header portion to identify at least the location and extent of the remainder portion of said data packet; storing the entire data packet of a selected data packet in the external buffer when the buffer on the chip configured to store the header of the given data packet is full; and moving only the header of a selected entire data packet stored in the external buffer to the buffer on the chip when the buffer on the chip has space therefor.

DETAILED DESCRIPTION OF THE PREFERRED EMBODIMENT(S)

Figure 1:
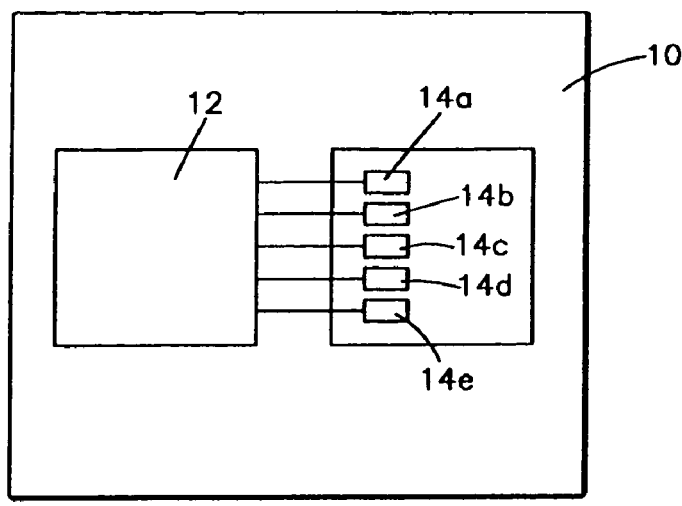
FIG. 1 is a diagrammatic view of a chip having a processor and an on-chip buffer according to this invention.

Referring now to the drawings and, for the present, to FIG. 1, an integrated circuit chip 10 is shown diagrammatically which has formed thereon a processor 12. The chip 10 is contained in a network processor to process packets of data to be transmitted to some other location. Such processors are well known in the art and need not be described further herein. The chip 10 also has formed thereon several buffers 14a-14e. There are multiple buffers in the preferred embodiment to accommodate packets of information of different priority, but it is to be understood that but a single buffer could be used if priority is not required. The buffers 14a-14e are fast response buffers, such as SRAMs which are fast acting, but are relatively small in size (e.g. as compared to DRAMs). The buffers 14a-14e are relatively limited in content and for the purpose of storing only the headers of data packets, as will be described presently.

Figure 2:
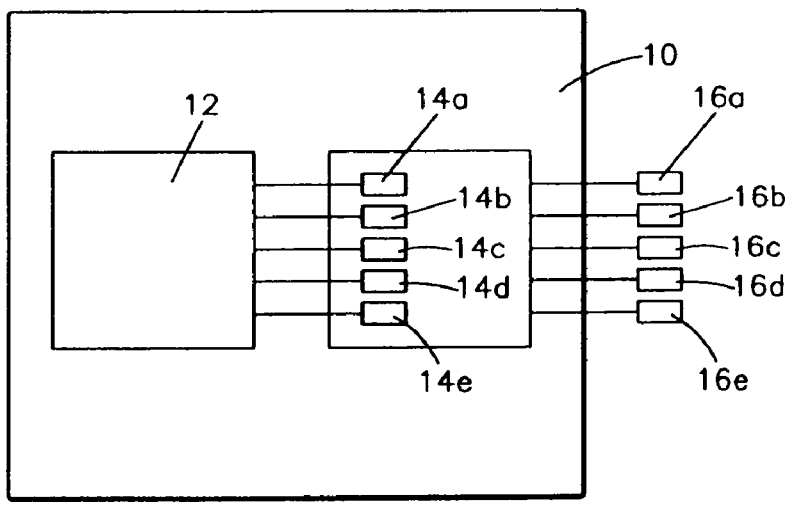
FIG. 2 is a diagrammatic representation of a chip having a processor and an on-chip buffer, and an off-chip buffer according to this invention.

Referring now to FIG. 2, a second set of buffers 16a-16e is shown. These buffers 16a- 16e are off-chip buffers, preferably DRAMs, and, thus, larger in size than the SRAM buffers 14a-14e, and, therefore, have greater storage capacity than the SRAM buffers 14a-14e. These buffers 16a-16e correspond to buffers 14a-14e and are arranged and configured to store the entire packet of data information, or a major portion of the packets of information, as will be described presently.

Figure 3:
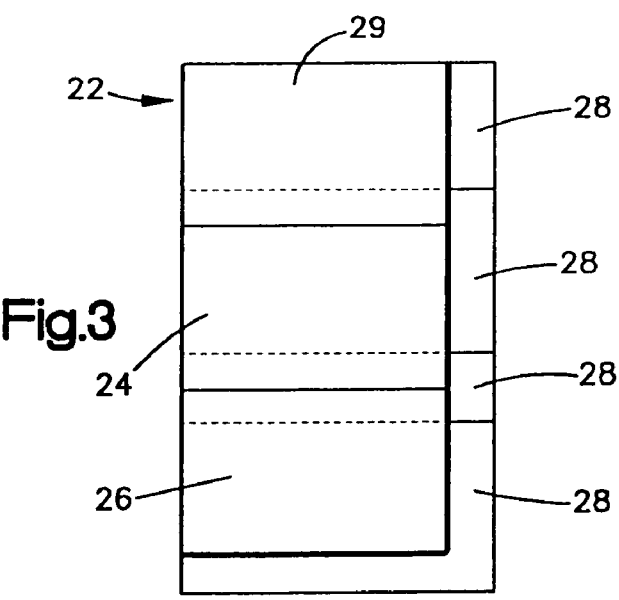
FIG. 3 is a diagrammatic representation of a frame having various components.
Figure 4:
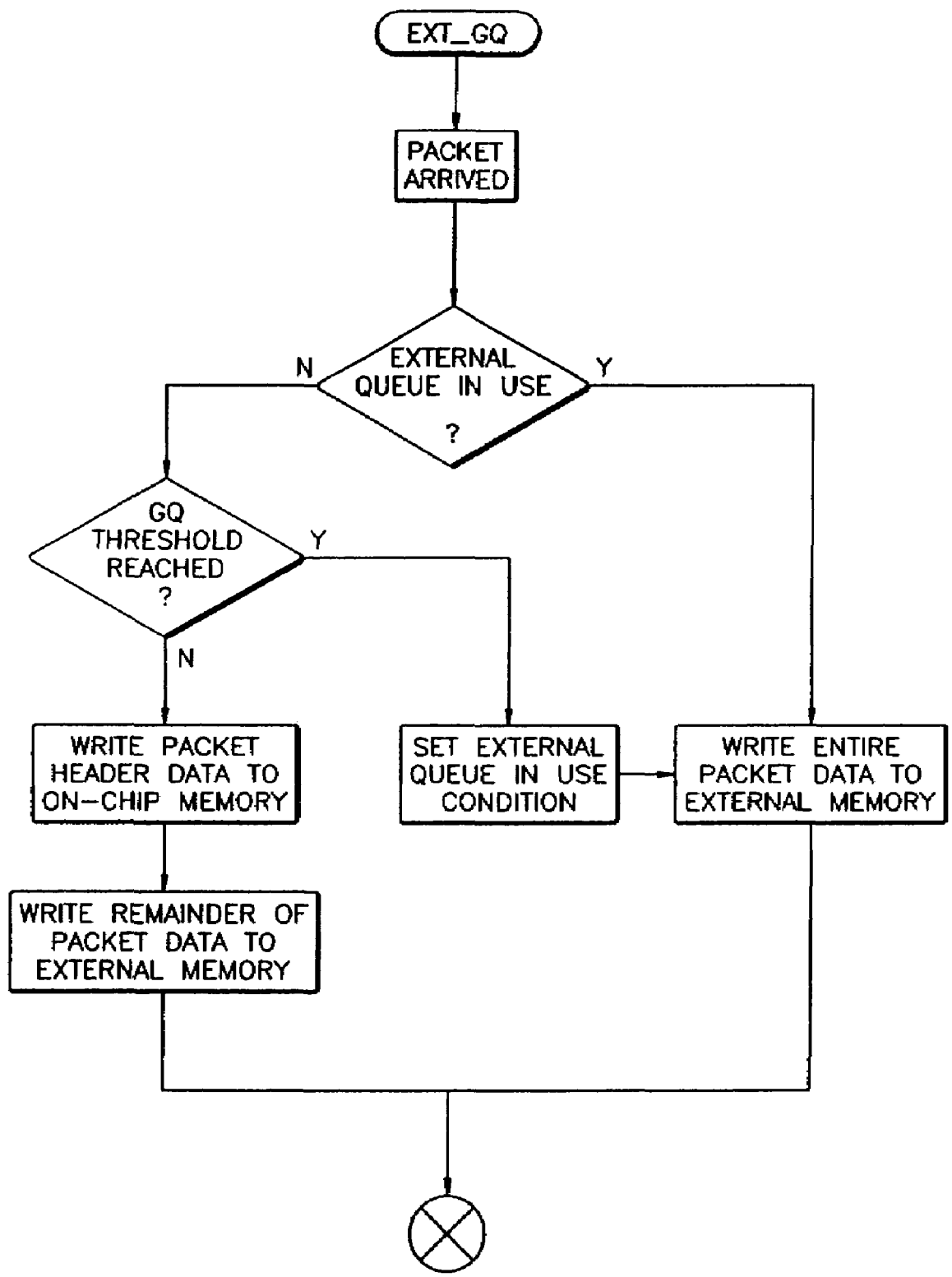
FIG. 4 is a flow chart of the flow of data to the chip and buffers.

Referring now to FIG. 3, the structure of a data packet 22 is shown somewhat diagrammatically. Each packet 22 contains a data section 24 which contains the data to be processed and transmitted, and a control block or control section 26, which contains the control information relating to the data being processed. For example, the control block 26 can, and typically does, contain information, such as next packet pointer (memory address) in the queue, packet byte count, and external memory starting address of packet section 24 information. This information is used in the storage and processing of the packet 22. It should be noted that the length of the packet 22 can and normally does extend over multiple buffers and, thus, the size and location of the beginning and end of the packet 22 is important.

The packet 22 according to this invention includes a header section 29 which is a significant aspect of this invention. The header section 29 is provided so that it may be severed and stored in an on-chip buffer 14a-14e, as will be described presently. The header section 29 includes information about the packet 22 which will allow the header section 29 to define uniquely where the remainder of the packet 22 may be stored. Some of this information may have to be supplied after the packet is received at the processor 12 if the remainder of the packet, i.e. sections 24 and 26, are to be stored in an off-chip buffer 16a-16e.

The invention operates in the following manner. A data packet 22 is received at the I/C chip 10 having the processor 12 thereon which will process and forward the data in a received data packet 22. The processor 12 has a program that looks to the priority of the data packet 22, normally contained in the control block 24, and checks if the on-chip buffer 14a-14e for that priority has space therein. If space is available in the appropriate on-chip buffer 14a-14e, then the processor severs the header section 29 from the rest of the data packet 22, stores the header section 29 in the determined appropriate on-chip buffer 14a-14e, stores the remainder of the data packet 22, i.e. the control block section 24 and the data section 26, in the corresponding off-chip buffer 16a-16e, and writes any necessary data in the header 29 to fully locate this remainder section in the off-chip buffer 16a-16e. When the designated header reaches the point in the queue that it is next to be processed, the remainder of the data packet 22 is retrieved from the off-chip buffer 16a-16e and delivered to the processor 12. If more than one data packet 22 is received while the processor is busy, the headers 29 are severed and stored in the appropriate on-chip buffer 14a-14e, and the remainder is stored on the appropriate corresponding off-chip buffer 16a-16e, and the headers are read from the buffers 14a-4e in their appropriate order. The fact that the on-chip buffers 14a-14e are much faster than the chip buffers 16a-16e significantly reduces the latency time for addressing the buffers and starting the processing of the next in line packet 22.

Figure 5:
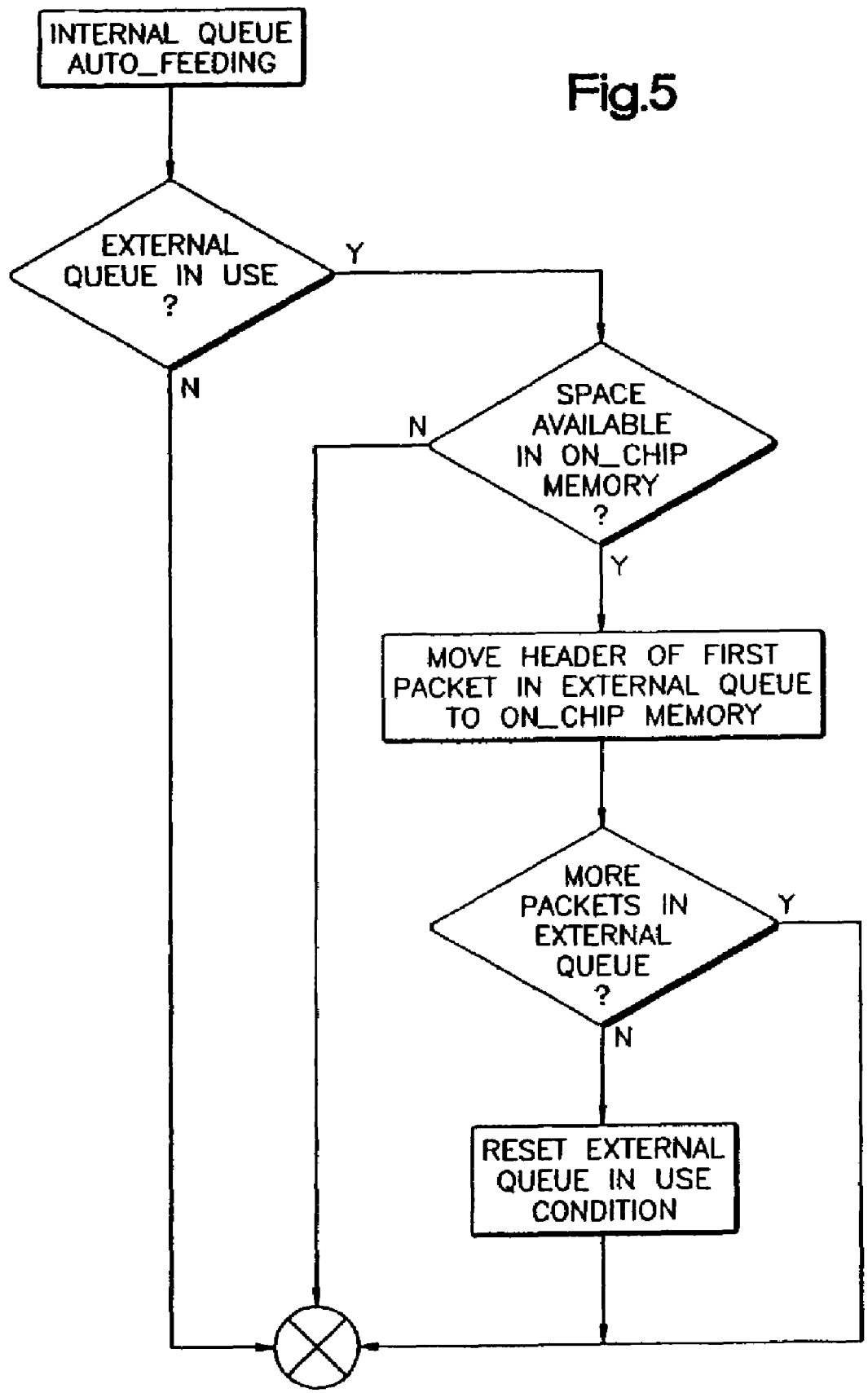
FIG. 5 is a flow chart for checking the status of the off-chip buffer.

If the traffic is unusually heavy at a given time, and the appropriate on-chip buffer 14a-14e is full, then the entire packet, including the header 29, is written to the appropriate off-chip buffer 16a-16e and such is recorded in the control block 24. A background task as shown in FIG. 5 in the network processor system, which is transparent to the computer program being executed, is continuously checking the status of the on-chip buffers 16a-16e. As soon as there is space in the appropriate on-chip buffer 14a-14e, the header portion 29 of the packet 22 is severed from the remainder of the packet 22 and moved into the appropriate on-chip buffer 14a-14e. Thus, there is a continuous reading from the fast on-chip buffers 14a-14e to locate and retrieve the data packets 22 which have been buffered.

While preferred embodiments of the invention have been described herein, variations in the design may be made, and such variations may be apparent to those skilled in the art of computer system design, as well as to those skilled in other arts. The components and other parameters above are by no means the only ones suitable for methods and systems according to the present invention, and substitutes will be readily apparent to one skilled in the art. The scope of the invention, therefore, is only to be limited by the following claims.

What is claimed is:

1. A method, comprising:
   receiving one or more data packets at an integrated chip having a processor thereon which processes and forwards data in data packets;
   determining a priority of each of the one or more received data packets via computer executable instructions executed by the processor, wherein each of the priorities is obtained from a control block of the corresponding data packet;
   determining if an on-chip buffer of a plurality of on-chip buffers for different priority located on the integrated chip, for the determined priority, has space available to store a header of the packet, for each received data packet;
   if space is available for the header, severing the header from the packet; storing the header in the on-chip; storing the remaining part of the packet in a corresponding off-chip buffer located external to the integrated chip; and writing data indicative of a location of the remaining part of the data packet in the off-chip buffer in the header; and
   if space is not available, storing the entire data packet in a corresponding off-chip buffer of a plurality of off-chip buffers for the different priority; and continuously checking a status of the on-chip buffer, and when space becomes available, severing the header from the packet; storing the header in the on-chip buffer; storing the remaining part of the packet in the corresponding off-chip buffer located external to the integrated chip; and writing data indicative of a location of the remaining part of the data packet in the off-chip buffer in the header; and
   processing the data packet by delivering any data of the data packet that is stored in the off-chip buffer to the processor, which processes and forwards the data packet to a destination external to the integrated chip.

2. The method of claim 1, wherein the status is checked as a background task.

3. The method of claim 2, wherein the plurality of on-chip buffers include SRAM.

4. The method of claim 3, wherein the plurality of off-chip buffers include DRAM.

5. The method of claim 4, wherein each packet includes:
   a data section that contains data to be processed and transmitted;
   a control block that contains control information relating to the data, wherein the control information includes a next packet pointer in a queue, a packet byte count, and an external memory starting address of the data section; and
   a header, including data packet information that uniquely defines where the remainder of the packet is stored.

6. The method of claim 5, wherein at least a sub-portion of the data packet information is supplied after the data packet is received at the processor.

7. The method of claim 6, wherein the sub-portion is supplied after the data packet is received at the processor if the remainder of the packet is to be stored in an off-chip buffer.

8. The method of claim 7, wherein the on-chip buffer is faster than the off-chip buffer.

* * * * *